(12) United States Patent
Webb

(10) Patent No.: US 6,823,509 B2
(45) Date of Patent: Nov. 23, 2004

(54) VIRTUAL MACHINE WITH REINITIALIZATION

(75) Inventor: Alan Michael Webb, Chandlers Ford (GB)

(73) Assignee: International Business Machines Corporation, Armonk, NY (US)

(*) Notice: Subject to any disclaimer, the term of this patent is extended or adjusted under 35 U.S.C. 154(b) by 604 days.

(21) Appl. No.: 09/741,582

(22) Filed: Dec. 20, 2000

(65) Prior Publication Data
US 2001/0051970 A1 Dec. 13, 2001

(30) Foreign Application Priority Data
May 31, 2000 (GB) .............................................. 0013132

(51) Int. Cl.[7] .............................. G06F 9/00; G06F 9/45
(52) U.S. Cl. .......................... 718/1; 718/102; 718/100; 717/174
(58) Field of Search .............................. 718/100, 101, 718/102, 103, 106, 107, 108, 1; 719/310, 318; 717/116, 118, 148, 174, 127, 318

(56) References Cited

U.S. PATENT DOCUMENTS 6,081,665 A * 6/2000 Nilsen et al. ............... 717/116
6,272,674 B1 * 8/2001 Holiday, Jr. ................. 717/174
6,374,286 B1 * 4/2002 Gee et al. .................... 718/108
6,496,871 B1 * 12/2002 Jagannathan et al. ....... 719/317
6,654,778 B1 * 11/2003 Blandy et al. ................. 718/1
6,654,948 B1 * 11/2003 Konuru et al. .............. 717/127
6,704,803 B2 * 3/2004 Wilson et al. .............. 719/315
6,704,804 B1 * 3/2004 Wilson et al. .............. 719/315

FOREIGN PATENT DOCUMENTS

EP            962860        8/1999     ............. G06F/9/46

* cited by examiner

Primary Examiner—Majid A. Banankhah
(74) Attorney, Agent, or Firm—Douglas W. Cameron; Anne V. Dougherty

(57) ABSTRACT

A computer system includes a virtual machine supporting an object-oriented environment, in which programs to run on the virtual machine are formed from classes loaded into the virtual machine by a class loader. A class must be initialized before being used by a program. A first application is started on the virtual machine, and a set of one or more classes are loaded and initialized for the first application, which is then run. After the first application has finished running, at least one class from the first application is reset. A second application is then started on the virtual machine. This (re)-initializes any classes that have been reset from the first application, prior to using them, but does not have to reload any reset classes.

27 Claims, 4 Drawing Sheets

VIRTUAL MACHINE WITH REINITIALIZATION

FIELD OF THE INVENTION

The invention relates to a virtual machine, and more particularly to a virtual machine which supports reinitialisation of classes.

BACKGROUND OF THE INVENTION

Programs written in the Java programming language (Java is a trademark of Sun Microsystems Inc) are generally run in a virtual machine environment, rather than directly on hardware. Thus a Java program is typically compiled into byte-code form, and then interpreted by the Java virtual machine (JVM) into hardware commands for the platform on which the JVM is executing. The JVM itself is an application running on the underlying operating system. An important advantage of this approach is that Java applications can run on a very wide range of platforms, providing of course that a JVM is available for each platform.

Java is an object-oriented language. Thus a Java program is formed from a set of class files having methods that represent sequences of instructions (somewhat akin to subroutines). A hierarchy of classes can be defined, with each class inheriting properties (including methods) from those classes which are above it in the hierarchy. For any given class in the hierarchy, its descendants (i.e. below it) are call subclasses, whilst its ancestors (i.e. above it) are called superclasses. At run-time objects are created as instantiations of these class files, and indeed the class files themselves are effectively loaded as objects. One Java object can call a method in another Java object. In recent years Java has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

It is desirable to run the same application repeatedly on a JVM, avoiding the need to reload the application classes at each new start. This is particularly the case in a server environment, where an application may represent a transaction (e.g. for a database), and the system has to process many transactions in rapid succession. One difficulty with this is that each application expects to start on a fresh, clean, platform to ensure predictable results. However, the JVM specification states that initialization will be performed once and only once for any given class. The prior art does not disclose any satisfactory method of running an application repeatedly and reliably on a single JVM without the overhead of reloading the application classes.

SUMMARY OF THE INVENTION

Accordingly, the invention provides a method of operating a computer system including a virtual machine supporting an object-oriented environment, in which programs to run on the virtual machine are formed from classes loaded into the virtual machine by a class loader, wherein a class must be initialized before being used by a program, said method comprising the steps of:
  starting a first application on the virtual machine, including loading and initializing a set of one or more classes for said first application;
  running said first application;
  after the first application has finished running, resetting at least one class from said set of one or more classes from the first application; and
  starting a second application on the virtual machine, said second application initializing said at least one class that has been reset from the first application, prior to use of said at least one class by the second application.

With this approach a new application can be started in a clean state, without having to load all the application classes as required in the prior art. Rather, the classes from a previous application can be retained in the system, and reinitialized before being used by the new application. This results in a significant performance improvement in terms of the start-up time of the new application, since it does not have the overhead of having to reload application classes. Clearly for this approach to be of significant benefit, the first and second applications must either be the same application (possibly running with different input data), or else similar or related applications which share a number of classes.

The invention is especially advantageous in a transaction processing environment. Here an application represents a transaction, and the system is used to process a large number of successive transactions, which are typically all performing variations of the same basic operation. In this case the duration of any individual transaction is likely to be relatively short, and so the ability to reuse classes and so reduce the transaction start up time is consequently of particular importance.

In the preferred embodiment each class has an initialization flag which is set when the class is initialized. The step of resetting at least one class therefore involves resetting the initialization flag to its state prior to initialization. This makes the class look as if it has not yet been initialized, and will therefore prompt its (re)initialisation by the second application. The step of resetting further includes setting variables to their default state prior to initialization, and any other necessary measures to put the class in the same state as if it had just been loaded.

Also in the preferred embodiment, the first and second applications run in a middleware environment. A middleware program is responsible for launching an application, for example to perform a transaction. This causes an application class loader instance to load the set of one or more classes for the first application. After this has completed, the middleware program initiates the step of resetting the application classes by calling a method of the application class loader. A reference to the application class loader instance is passed with this method, and the system then checks that this reference is the only valid remaining reference to the application class loader instance and the set of classes loaded by it. This ensures that the application class loader instance and its associated classes could actually be garbage collected now, apart from this one remaining reference. Then, once the necessary reinitialisation measures have been performed on the class loader instance and its classes, this reference is returned back to the middleware program, which can then start a new application using the refreshed class loader and classes. Note that this also avoids have to create a new instance of the application class loader itself.

In a more complicated implementation, the virtual machine maintains a pool of application class loader instances and associated classes. Each time the middleware program calls the reset method, the application class loader instances specified by the reference passed with this call are added to the pool. On return from the call, the middleware program receives a reference to a reinitialized application class loader instance and associated classes. This may be the same one as just surrendered, or it may be one surrendered by a previous reset call, and which is immediately available (i.e. has already been reinitialized). Note that if no suitable class loader instance is available from a pool, then the reset call will have to instantiate a new application class loader instance, which clearly will then need to load the application classes for itself—this is effectively what happens in a conventional system without the ability to reuse as described herein.

Clearly many enhancements can be made to the operation of the pool, and the way in which the reset call interacts with it. For example parameters on the reset call might be used to indicate how long to wait for an reinitialized application class loader instance to become available before instantiating a new one. Such parameters might also be used to specify interest in only a subset of those class loaders in the pool, such as a particular subclass of the main application class loader, or perhaps requiring that the call return the particular class loader instance that is referenced in the call itself.

The invention further provides a computer system including a virtual machine supporting an object-oriented environment, in which programs to run on the virtual machine are formed from classes loaded into the virtual machine by a class loader, wherein a class must be initialized before being used by a program, said system comprising:

means for starting a first application on the virtual machine, including loading and initializing a set of one or more classes for said first application;

means for running said first application;

means responsive to the first application finishing running, for resetting at least one class from said set of one or more classes from the first application; and means for starting a second application on the virtual machine, said second application initializing said at least one class that has been reset from the first application, prior to use of said at least one class by the second application.

The invention further provides a computer program product, comprising computer program instructions typically recorded onto a storage medium or transmitted over a network, for implementing the above methods.

BRIEF DESCRIPTION OF THE DRAWINGS

A preferred embodiment of the invention will now be described in detail by way of example only with reference to the following drawings.

DETAILED DESCRIPTION

Figure 1:
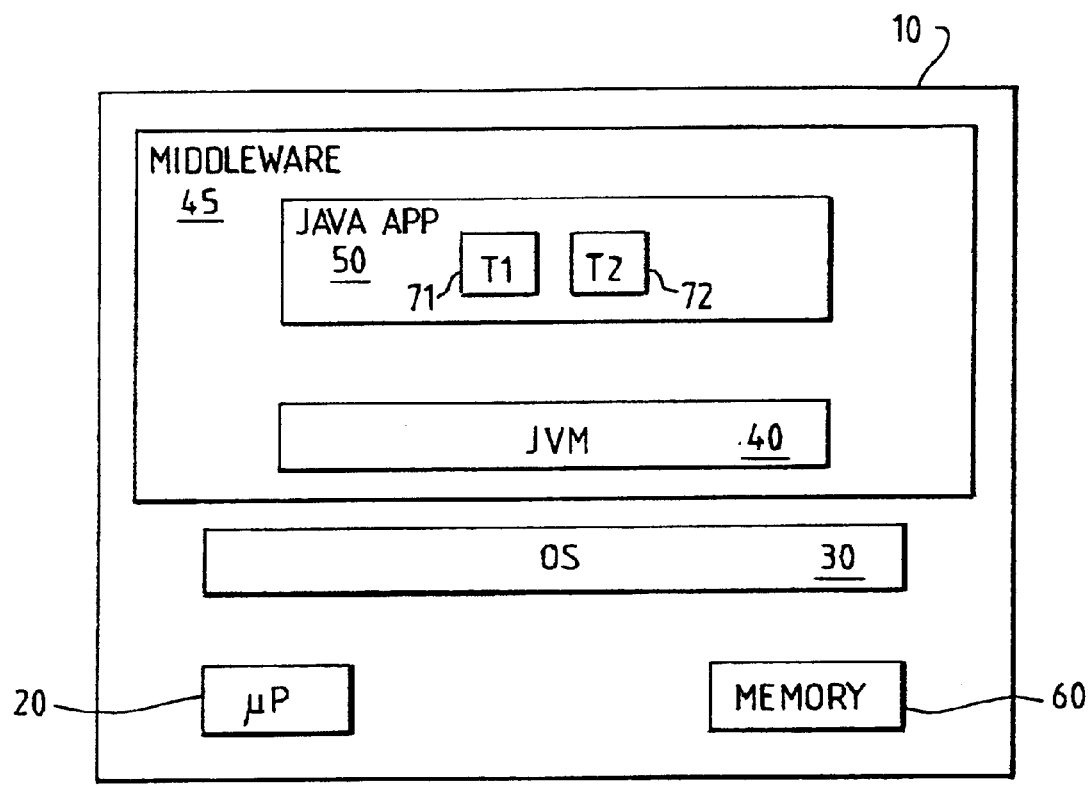
FIG. 1 shows a schematic diagram of a computer system supporting a Java Virtual Machine (JVM)

FIG. 1 illustrates a computer system 10 including a (micro)processor 20 which is used to run software loaded into memory 60. The software can be loaded into the memory by various means (not shown), for example from a removable storage device such as a floppy disc or CD ROM, or over a network such as a local area network (LAN) or telephone/modem connection, typically via a hard disk drive (also not shown). Computer system runs an operating system (OS) 30, on top of which is provided a Java virtual machine (JVM) 40. The JVM looks like an application to the (native) OS 30, but in fact functions itself as a virtual operating system, supporting Java application 50. A Java application may include multiple threads, illustrated by threads T1 and T2 71, 72.

System 10 also supports middleware 45, for example a transaction processing environment such as Websphere, available from IBM Corporation. The middleware runs as an application or environment on operating system 30, and initiates the JVM 40. The middleware then performs transactions as Java applications 50 on top of the JVM 40. In accordance with the present invention, and as will be described in more detail below, the middleware can cause successive transactions to run on the same JVM. In a typical server environment, multiple JVMs may be running on computer system 10, in one or more middleware environments.

It will be appreciated that computer system 10 can be a standard personal computer or workstation, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40.

Figure 2:
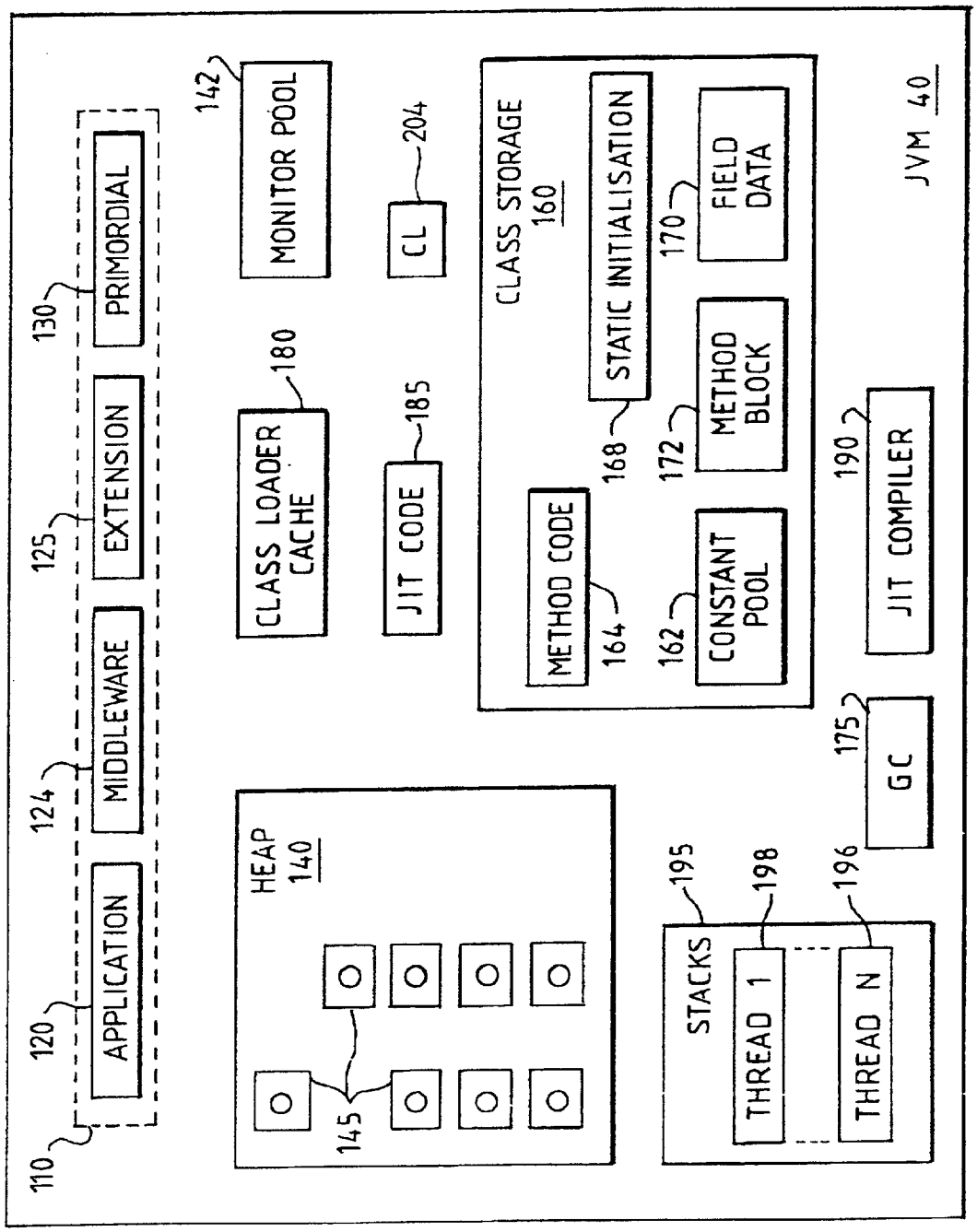
FIG. 2 illustrates some internal components of the JVM.

FIG. 2 shows the structure of JVM 40 in more detail (omitting some components which are not directly pertinent to an understanding of the present invention). The fundamental unit of a Java program is the class, and thus in order to run any application the JVM must first load the classes forming and required by that application. For this purpose the JVM includes a hierarchy of class loaders 110, which conventionally includes three particular class loaders, named Application 120, Extension 125, and Primordial 130. An application can add additional class loaders to the JVM (a class loader is itself effectively a Java program). In the preferred embodiment of the present invention, a fourth class loader is also supported, Middleware 124. Classes which are loaded by this class loader will be referred to hereinafter as middleware, whilst those loaded by Application Class loader 120 will be referred to as application.

For each class included within or referenced by a program, the JVM effectively walks up the class loader hierarchy, going first to the Application class loader, then the Middleware loader, then the Extension class loader, and finally to the Primordial class loader, to see if any class loader has previously loaded the class. If the response from all of the class loaders is negative, then the JVM walks back down the hierarchy, with the Primordial class loader first attempting to locate the class, by searching in the locations specified in its class path definition. If this is unsuccessful, the External class loader then makes a similar attempt, if this fails the Middleware class loader tries. Finally, if this fails the Application class loader tries to load the class from one of the locations specified in its class path (if this fails, or if there is some other problem such as a security violation, the system returns an error). It will be appreciated that a different class path can be defined for each class loader.

Note that if it is desired to load a further middleware class loader (i.e. one provided by the user rather than included within the JVM itself), then this can be achieved by declaring that the new class loader implements the middleware interface. This declaration by itself is sufficient for the JVM to treat it as a middleware class loader—no other method definitions or such-like are required.

The JVM further includes a component CL 204, which also represents a class loader unit, but at a lower level. In other words, this is the component that actually interacts with the operating system to perform the class loading on behalf of the different (Java) class loaders 110.

The JVM also includes a heap 140, which is shared between all threads, and is used for storage of objects 145. Each loaded class represents an object, and therefore can be found on the heap. In Java a class file effectively defines a type of object, and this is then instantiated one or more times in order to utilize the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2).

The JVM also includes a class storage area 160, which is used for storing information relating to the class files in the heap 140. This area includes the method code region 164 for storing byte code for implementing class method calls, and a constant pool 162 for storing strings and other constants associated with a class. The class storage area also includes a field data region 170 for sharing static variables (static in this case implies shared between all instances of a class), and an area 168 for storing static initialization methods and other specialized methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag (not shown) to indicate whether or not they have been initialized.

The JVM further includes a storage area for just-in time (JIT) code 185, equivalent to method byte code which has already been compiled into machine code to be run directly on the native platform. This code is created by the JVM from Java byte code by a compilation process using JIT compiler 190, typically when the application program is started up or when some other usage criterion is met, and is used to improve run-time performance by avoiding the need for this code to be interpreted later.

Another component of the JVM is the stack area 195, which is used for storing the stacks 196, 198 associated with the execution of different threads on the JVM. Note that because the system libraries and indeed parts of the JVM itself are written in Java, and these frequently use multi-threading, the JVM may be supporting multiple threads even if the user application 50 running on top of the JVM contains only a single thread itself.

Also included within JVM are class loader cache 180 and garbage collection (GC) unit 175. The former is effectively a table used to allow a class loader to trace those classes which it initially loaded into the JVM. The class loader cache therefore allows each class loader to check whether it has loaded a particular class—part of the operation of walking the class loader hierarchy described above. Note also that it is part of the overall security policy of the JVM that classes will typically have different levels of permission within the system based on the identity of the class loader by which they were originally loaded.

Garbage collection unit 175 is used to delete objects from heap 140 when they are no longer required. Thus in the Java programming language, applications do not need to specifically request or release memory, rather this is controlled by the JVM itself. Therefore, when Java application 120 creates an object 145, the JVM secures the requisite memory resource. Then, when the Java application finishes using object 145, the JVM can delete the object to free up this memory resource. This latter process is known as garbage collection, and is generally performed by briefly interrupting all threads 196, 198, and scanning the heap 140 for objects which are no longer referenced, and hence can be deleted. The details of garbage collection vary from one JVM implementation to another, but typically GC is scheduled when the heap is nearly exhausted and so there is a need to free up space for new objects.

In general a class object will not be garbage collected by the JVM unless its class loader is deleted, and unless the class is no longer executing (i.e. no longer referenced from the stack 195 or from another location such as the class cache or another object). Note that the destruction of a class loader (or more accurately, the deletion of all references to the class loader) is in fact a relatively straightforward operation, since it is simply an instance of a class, and can always be reinstantiated. Such deletion is accompanied by the removal of all relevant entries in the class loader cache. The destruction of a class loader has been used in the prior art to allow any class files loaded by that class loader to be reloaded and reinitialized.

Finally, FIG. 2 shows a monitor pool 142, which is used for storing a set of locks (monitors) that are used to control contention to an object by different threads at times when exclusive access to the object is required.

Figure 3:
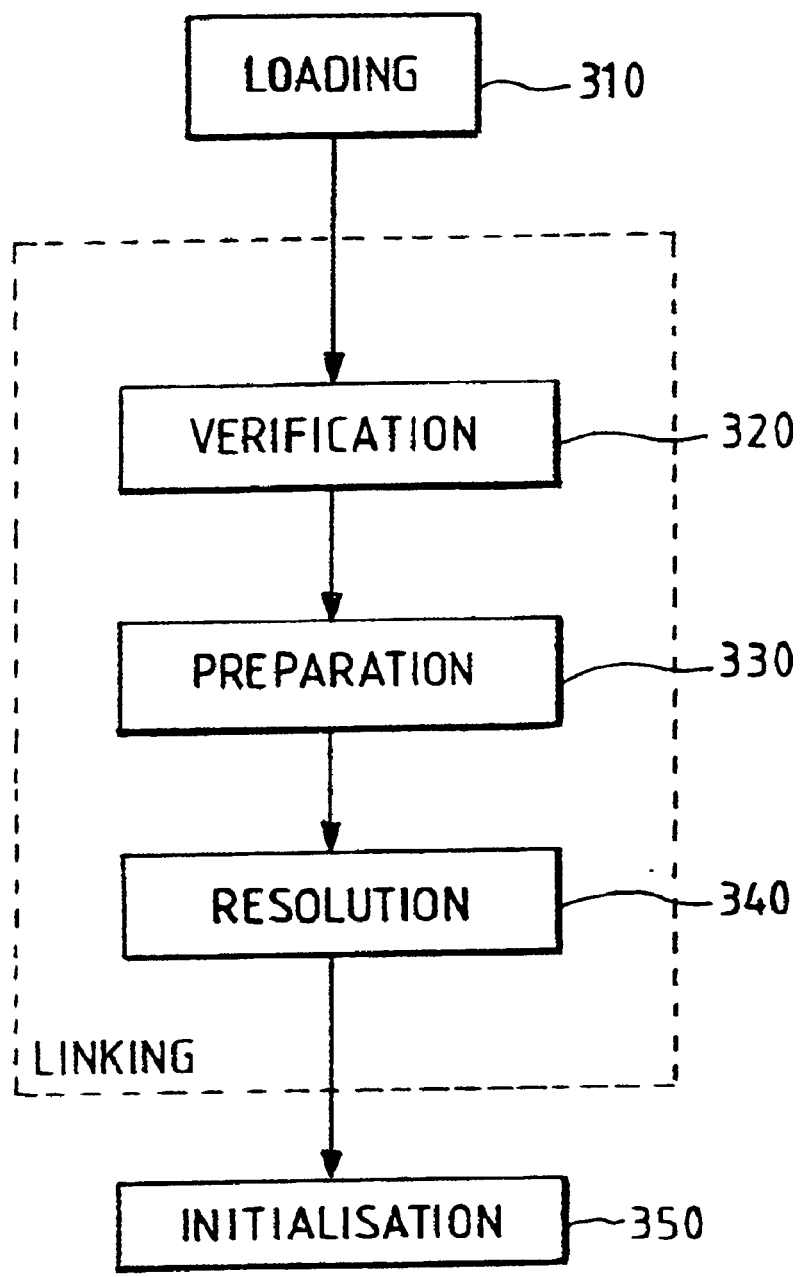
FIG. 3 is a flowchart depicting the steps required to load a class and prepare it for use.

FIG. 3 is a flowchart illustrating the operations conventionally performed to start running a Java application. The first operation is loading (step 310) in which the various class loaders try to retrieve and load a particular class. The next operation is linking, which comprises three separate steps. The first of these is verification (step 320), which essentially checks that the code represents valid Java programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the JVM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the JVM implementation how many classes are loaded at this stage, as opposed to waiting until such classes are actually needed before loading them.

The final step in FIG. 3 is the initialization of a loaded class (step 350), which represents calling the static initialization method (or methods) of the class. According to the formal JVM specification, this initialization must be performed once and only once before the first active use of a class, and includes things such as setting static (class) variables to their initial values (see the above-mentioned book by Lindholm and Yellin for a definition of "first active use"). Note that initialization of an object also requires initialization of its superclasses, and so this may involve recursion up a superclass tree in a similar manner to that described for resolution. The initialization flag in a class file 145 is set as part of the initialization process, thereby ensuring that the class is not subsequently re-initialised.

The end result of the processing of FIG. 3 is that a class has been loaded into a consistent and predictable state, and is now available to interact with other classes. In fact, typically at start up of a Java program and its concomitant JVM, some 1000 objects are loaded prior to actual running of the Java program itself. This gives some idea of the initial delay and overhead involved in beginning a Java application.

As mentioned above, in a transaction processing environment with many successive applications running under the overall control of middleware, each application expects to start from a clean state. Typically this involves deleting the class objects from the previous application, and loading class objects for the new application. Note that given the repetitive nature of the types of applications being performed, in many cases successive applications will in fact be the same, or at least using the same classes. Deleting and reloading the same classes can cause a significant delay in starting the new application.

Figure 4:
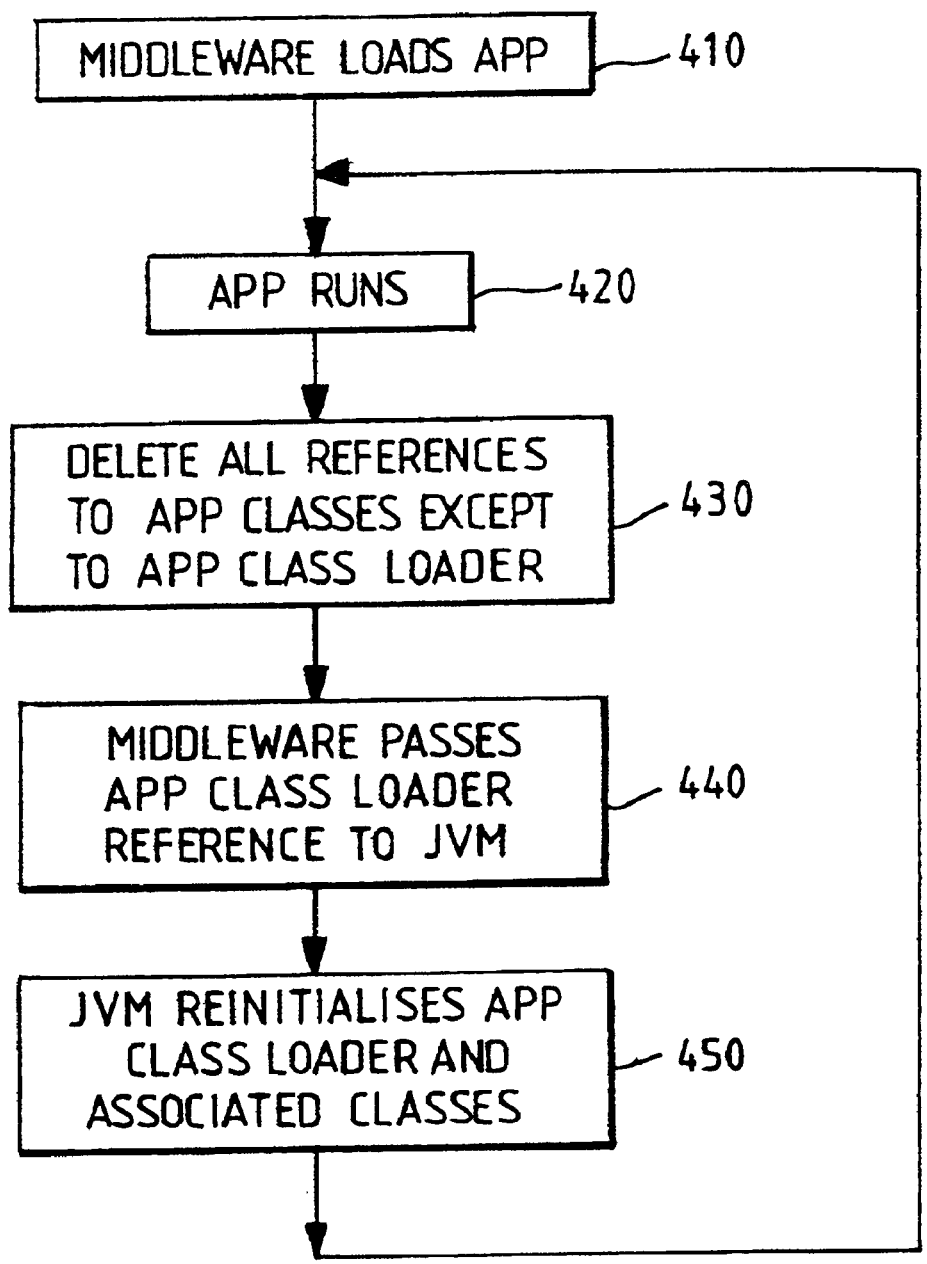
FIG. 4 is a flowchart depicting the preferred method of the present invention.

FIG. 4 illustrates a method in accordance with the present invention whereby this problem can be largely overcome. The method starts with the middleware initiating an application (e.g. a transaction), it being assumed that both the relevant part of the middleware and the application here are Java programs. In order to do this, the middleware creates an instance of the application class loader (it cannot use an existing one because the application class loader is below the middleware class loader in the class loader hierarchy as shown in FIG. 2, and so it has no reference to it). The new application class loader instance then loads the application classes into the JVM (step 410), and involves the steps shown in FIG. 3 for all the application classes. The application is then run in standard fashion (step 420), and after completion control returns to the middleware.

Assuming that it is now desired to re-run essentially the same application, but for a new transaction, it is important to reset the application. As noted above, this would normally be achieved by deleting all references to the application classes and application class loader, the latter being required because in conformity with the JVM specification a class can only be deleted in conjunction with its class loader (deletion here implying deletion of references to permit a subsequent garbage collection). This would allow the same classes to then be reloaded by a new instance of the application class loader, initialized, and then run as normal from a clean state.

However, as shown in FIG. 4 and in accordance with the present invention, rather than deleting all references to the application classes and the application class loader, the middleware retains a single reference to the application class loader instance (step 430). This is sufficient to prevent garbage collection of the class loader and all the application classes that it has loaded.

This single reference is then passed by the middleware to the JVM (step 440), in the preferred embodiment by a call: ccl=ccl.reuse( ), where ccl is a variable that contains the class loader reference. The reuse (or reset) method is provided as static, protected, native method of the class loader implementation. Note that the reuse method has to be native because the operations it needs to perform as described below are not available to pure Java instructions (and hence is largely implemented by block CL 204 in FIG. 2). Making the method static means that it applies to the class, rather than to any particular instance, and is particularly relevant if a pool of class loader instances are being maintained (see below). Finally, making the method protected increases its default accessibility to include from subclasses. It may also be appropriate for the method to be defined as final to prevent subclasses from overriding it (possibly desirable from a security point of view).

The processing of the reuse method call is firstly to check that the reference it has been passed is indeed only the single outstanding reference to that class loader and its classes. In the simplest implementation, this checking is deferred until the next garbage collection cycle is performed, when the system is typically temporarily frozen to allow objects references to be reviewed to detect those objects available for garbage collection. If this check finds that more than the single reference exists, then the method returns with an error condition.

It is assumed however that there is indeed only a single remaining reference to the class loader, and none to its classes. The system would now, but for this single remaining reference, be in a position to garbage collect the class loader and its classes, and then reinstantiate the class loader and reload the new set of classes. In accordance with the present invention, it is recognized that this actually represents redundant work, and that rather the existing classes can simply be reinitialized (step 450). More particularly, the initialization flag on each class is reset to the state that indicates that the class has not been initialized. Consequently, the class must be initialized (again) before any subsequent use is made of it, in accordance with the normal initialization behavior of the JVM. This occurs when the reuse method returns after the reset, together with the reference to the class loader that was originally supplied with the call. The middleware can now start the next application, re-using this class loader instance, and the application is run once more (step 420 again) (this looping continuing until it is no longer desired to run the application any more).

Note that formally the JVM specification requires that any class object be initialized once and only once. However, logically there is no difference between deleting an old class, reloading it, and then initializing it, compared to simply reinitializing the old class. Certainly, a given class may be loaded an arbitrary number of times under different class loaders and will be statically initialized each time. In this case the re-used class loader can be regarded as a new class loader that happens to have the same reference as a previously active class loader. Accordingly, the approach described herein produces results fully in conformance with the JVM specification, and the modification is essentially transparent to the application. One important aspect in this respect is that because the class loader and associated class structure is never out of context, being maintained throughout, the security controls in terms of class ownership are fully satisfied.

In addition to resetting the initialization flag, it is also necessary to reset the static memory state to the default values required by the JVM specification. For example, if a particular class initial variable is defined as having an initial value of 20, the class loader will in fact assign it first the standard default value (which happens to be 0), and the variable is only subsequently set to 20. It turns out that in some cases this default value can be visible to the application, hence the need to reset such variables. In other words, the reuse method effectively needs to mimic the operations originally performed by the class loader when the class was first loaded.

However, unlike loading the class from scratch, many operations, such as resolution, the physical loading of byte codes, and the creation and loading of JIT code, are redundant in the sense that having been performed by the original class loading operation, they do not need to be repeated. Consequently, the approach of the present invention produces a significant saving in the time required to re-start an application, compared to the prior art strategy of having to fully reload the application. In addition, other optimizations may also be possible as part of the reinitialisation process.

There is one way in which the approach described above may lead to a different result compared to a full reload of the application, and this is where a class file is modified inbetween the original load and the reload. In the approach described herein, such change would not of course be picked up. In this respect it is noted firstly that the time at which a particular class is actually loaded in conventional JVM operation is not deterministic anyway (it may occur at any moment between start of the program and first actual use of the class). Secondly, the reuse method can include standard techniques to check the currency of the loaded class (such techniques are often used in relation to caches). For example, a given class may only be permitted to be reused a certain number of times or for a certain time period before being reloaded, or the currency of a loaded class can be formally checked in terms of date, time, version number etc against that of the class stored on disk or wherever. Since such checking operations are likely to slow down the start of the new application, typically the caller of the reuse method will have the ability to specify whether or not they are to be performed.

The implementation described above involves reuse of just a single class loader instance. However, a JVM, and more particularly the middleware, may run multiple transactions in parallel, typically as different threads. As one transaction (application) finishes, the reuse method could be called as described above. The JVM would effectively maintain a pool into which the returned class loader instance and its associated classes would be added. When a new application is launched by the middleware, a class loader instance and its classes can then be retrieved from this pool. Thus the return from a reuse method may specify the same reference as originally supplied, in other words direct reuse of the class loader surrendered by that call to the pool, or it may return a different reference, to a class loader that had previously been surrendered by a different reuse call. If such a previously surrendered class loader instance is available, this will be quicker than having to wait for reset of the initialization flags etc for the class loader instance surrendered by that particular call, especially if such reset involves waiting for a garbage collection cycle as described above. Note that if no class loader instance is available for reuse from the pool (nor perhaps becomes available within a given time limit), then a new instance of the class loader must be formed, and the application classes loaded afresh. This latter option is of course what happens in a conventional JVM to launch a new application.

Where the above approach is adopted, of the JVM maintaining a pool of returned class loader instances, it will generally be desirable to have a mechanism for getting rid of these once the middleware has completed its processing. For example, a call of flushReuseSet could delete all class loaders and classes from the pool (or more accurately, make them available for future garbage collection), either at termination of the middleware, or when it is desired to explicitly force new loading of the classes, for example to maintain currency.

It will be appreciated that the preferred embodiment described herein is based primarily on modifications to the running of the JVM itself. No modifications are required to the application (transaction) code, so that the running in series of multiple transactions on a single JVM is transparent to the transactions themselves. The middleware of course does need to be changed in order to make this reuse call. However the design philosophy here is that the middleware is a relatively sophisticated and trustworthy application, which can be relied upon to cooperate properly with the JVM in performance of the mechanism described above. (It is assumed that the middleware is capable of performing any tidy up operations on itself that might be required between applications, as part of the standard processing of the middleware).

It will be appreciated that the skilled person will be aware of many variations on the implementation described above. For example, the preferred embodiment represents a server embodiment, but the invention is also potentially applicable to the client embodiment, such as when it is necessary to have a quick start-up of applications. In addition, the invention has been described in relation to the Java programming language, but is also potentially applicable to other object oriented environments running on a virtual machine. Many further modifications will be apparent to the skilled person.

What is claimed:

1. A method of operating a computer system including a virtual machine supporting an object-oriented environment, in which programs to run on the virtual machine are formed from classes loaded into the virtual machine by a class loader, wherein a class must be initialized before being used by a program, said method comprising the steps of:
   starting a first application on a virtual machine, including loading and initializing a set of one or more classes for said first application;
   running said first application;
   after the first application has finished running, resetting at least one class from said set of one or more classes from the first application; and
   starting a second application on the virtual machine, said second application initializing said at least one class that has been reset from the first application without having to load said at least one class into said virtual machine, prior to use of said at least one class by the second application.

2. The method of claim 1, wherein each class has an initialization flag which is set when the class is initialized, and said step of resetting at least one class comprises resetting said initialization flag to its state prior to initialization.

3. The method of claim 2, wherein said step of resetting further comprises setting variables to their default state prior to initialization.

4. The method of claim 1, wherein the first and second applications run in a middleware environment, and a middleware program initiates said steps of starting a first application and starting a second application.

5. The method of claim 4, wherein said step of loading the set of one or more classes for the first application is performed by an application class loader instance, and said middleware program initiates said step of resetting at least one class by calling a method of the application class loader.

6. The method of claim 5, wherein the step of calling a method of the application class loader comprises passing a reference to said application class loader instance.

7. The method of claim 6, wherein said step of resetting further comprises checking that said reference to said application class loader instance is the only valid remaining reference to said application class loader instance and the set of one or more classes loaded by it.

8. The method of claim 5, wherein said method is a static method.

9. The method of claim 5, further comprising the steps of the virtual machine maintaining a pool of application class loader instances and associated classes, and responding to said method call by returning to the middleware a reference to one of the application class loader instances from said pool.

10. A computer system including a virtual machines supporting an object-oriented environment, in which programs to run on the virtual machine are formed from classes loaded into the virtual machine by a class loader, wherein a class must be initialized before being used by a program, said system comprising:

means for starting a first application on the virtual machine, including loading and initializing a set of one or more classes for said first application;

means for running said first application;

means responsive to the first application finishing running, for resetting at least one class from said set of one or more classes from the first application; and means for starting a second application on the virtual machine, said second application initializing said at least one class that has been reset from the first application without having to load said at least one class into said virtual machine, prior to use of said at least one class by the second application.

11. The system of claim 10, wherein each class has an initialization flag which is set when the class is initialized, and said means for resetting at least one class comprises means for resetting said initialization flag to its state prior to initialization.

12. The system of claim 11, wherein said means for resetting further comprises means for setting variables to their default state prior to initialization.

13. The system of claim 10, wherein the first and second applications run in a middleware environment, and a middleware program activates said means for starting a first application and starting a second application.

14. The system of claim 13, wherein said means for loading the set of one or more classes for the first application comprises an application class loader instance, and said middleware program activates said means for resetting at least one class by calling a method of the application class loader.

15. The system of claim 14, wherein calling a method of the application class loader involves passing a reference to said application class loader instance.

16. The system of claim 15, wherein said means for resetting further comprises means for checking that said reference to said application class loader instance is the only valid remaining reference to said application class loader instance and the set of one or more classes loaded by it.

17. The system of claim 14, wherein said method is a static method.

18. The system of claim 14, wherein the virtual machine includes a pool of application class loader instances and associated classes, and responds to said method call by returning to the middleware a reference to one of the application class loader instances from said pool.

19. A computer program product comprising a set of computer readable instructions recorded on a medium, said instructions implementing a virtual machine supporting an object-oriented environment, in which programs to run on the virtual machine are formed from classes loaded into the virtual machine by a class loader, wherein a class must be initialized before being used by a program, said virtual machine comprising:

means for starting a first application on the virtual machine, including loading and initializing a set of one or more classes for said first application;

means for running said first application;

means for resetting at least one class from said set of one or more classes from the first application after the first application has finished running; and means for starting a second application, said second application causing the virtual machine to initialize said at least one class that has been reset from the first application without having to load the at least one class into said virtual machine, prior to use of said at least one class by the second application.

20. The program product of claim 19, wherein each class has an initialization flag which is set when the class is initialized, and said means for resetting at least one class comprises means for resetting said initialization flag to its state prior to initialization.

21. The program product of claim 20, wherein said means for resetting further comprises means for setting variables to their default state prior to initialization.

22. The program product of claim 19, wherein the first and second applications run in a middleware environment, and a middleware program activates said means for starting a first application and starting a second application.

23. The program product of claim 22, wherein said means for loading the set of one or more classes for the first application comprises an application class loader instance, and said middleware program activates said means for resetting at least one class by calling a method of the application class loader.

24. The program product of claim 23, wherein calling a method of the application class loader involves passing a reference to said application class loader instance.

25. The program product of claim 24, wherein said means for resetting further comprises means for checking that said reference to said application class loader instance is the only valid remaining reference to said application class loader instance and the set of one or more classes loaded by it.

26. The program product of claim 23, wherein said method is a static method.

27. The program product of claim 23, wherein the virtual machine includes a pool of application class loader instances and associated classes, and responds to said method call by returning to the middleware a reference to one of the application class loader instances from said pool.

* * * * *